US008266619B2

United States Patent
Ye et al.

(10) Patent No.: US 8,266,619 B2
(45) Date of Patent: Sep. 11, 2012

(54) EMBEDDED OPERATING SYSTEM ARCHITECTURE FOR SMART CARD

(75) Inventors: Xin Ye, Beijing (CN); Jiye Lei, Beijing (CN)

(73) Assignee: Beijing Watch Data System Co., Ltd., Chaoyang District, Bejing (CN)

( * ) Notice: Subject to any disclaimer, the term of this patent is extended or adjusted under 35 U.S.C. 154(b) by 975 days.

(21) Appl. No.: 12/300,334

(22) PCT Filed: Jan. 25, 2007

(86) PCT No.: PCT/CN2007/000286
§ 371 (c)(1),
(2), (4) Date: Nov. 10, 2008

(87) PCT Pub. No.: WO2007/112635
PCT Pub. Date: Oct. 11, 2007

(65) Prior Publication Data
US 2009/0150888 A1    Jun. 11, 2009

(30) Foreign Application Priority Data
Apr. 3, 2006 (CN) .......................... 2006 1 0072909

(51) Int. Cl.
G06F 9/48 (2006.01)
G06F 9/52 (2006.01)
G06F 9/54 (2006.01)

(52) U.S. Cl. .................. 718/100; 718/102; 718/103

(58) Field of Classification Search ................. None
See application file for complete search history.

(56) References Cited

U.S. PATENT DOCUMENTS
5,012,409 A * 4/1991 Fletcher et al. ............. 718/103
(Continued)

FOREIGN PATENT DOCUMENTS
CN    1285549 A    2/2001
(Continued)

OTHER PUBLICATIONS

James F. Ready, VRTX: A Real-Time Operating System for embedded Microprocessor Applications, IEEE Micro. 6(4), Aug. 1986, pp. 8-17.*

(Continued)

*Primary Examiner* — Meng An
*Assistant Examiner* — Benjamin Wu
(74) *Attorney, Agent, or Firm* — Knobbe Martens Olson & Bear LLP

(57) ABSTRACT

An embedded operating system of smart card and the method for processsing task are disclosed. The method includes: A, initializing the system; B, creating at least one task according to the function set by the system; C, scheduling the pre-execution task according to the priority of the system; D, executing the task and returning the executing result through a data transmission channel. The invention enchances the support of the data channel of the hardware platform, and not only supports the single data channel, ISO7816, of conventional smart cards, but also supports the status of two or more data channels coexisting, in order to make the smart card transmit the information more flexible with higher speed with device terminals. The invention enchances the support of application of smart card, and not only supports the single application on the conventional smart card, but also supports several applications running simultaneity on one card, in order to utilize the smart card with higher efficiency.

8 Claims, 3 Drawing Sheets

U.S. PATENT DOCUMENTS

| | | | |
|---|---|---|---|
| 5,890,169 | A | 3/1999 | Wong et al. |
| 6,564,995 | B1* | 5/2003 | Montgomery ............... 235/379 |
| 6,970,891 | B1 | 11/2005 | Deo et al. |
| 7,207,045 | B2* | 4/2007 | Goiffon ................... 718/107 |
| 7,350,049 | B1 | 3/2008 | Li et al. |
| 7,529,817 | B2 | 5/2009 | Kim |
| 2004/0256470 | A1 | 12/2004 | Takami et al. |
| 2005/0050108 | A1 | 3/2005 | Sawant et al. |
| 2005/0188373 | A1* | 8/2005 | Inoue et al. ............... 718/100 |
| 2006/0020745 | A1 | 1/2006 | Conley et al. |
| 2006/0041709 | A1 | 2/2006 | Nishiura |
| 2006/0149916 | A1 | 7/2006 | Nase |
| 2006/0194595 | A1 | 8/2006 | Myllynen et al. |
| 2007/0198997 | A1* | 8/2007 | Jacops et al. ............... 719/328 |

FOREIGN PATENT DOCUMENTS

| | | |
|---|---|---|
| CN | 1308750 A | 8/2001 |
| CN | 1345154 A | 4/2002 |
| CN | 2514594 Y | 10/2002 |
| CN | 1118025 C | 8/2003 |
| CN | 1529524 A | 9/2004 |
| CN | 1 545 072 | 11/2004 |
| CN | 1545072 | 11/2004 |
| CN | 1585512 A | 2/2005 |
| CN | 1632765 A | 6/2005 |
| CN | 1 687 905 | 10/2005 |
| CN | 1744090 A | 3/2006 |
| CN | 1790388 A | 6/2006 |
| CN | 100351812 C | 11/2007 |
| EP | 1 513 098 | 3/2005 |
| JP | 11-110510 | 4/1999 |
| JP | 2003-288258 A | 10/2003 |
| JP | 2004-192447 | 7/2004 |
| JP | 2005-141335 A | 6/2005 |
| WO | WO 99/57675 | 11/1999 |
| WO | WO 2005/719990 A1 | 8/2005 |

OTHER PUBLICATIONS

VRTXsa Real-Time Kernel Programmer's Guide and Reference.*
Josep Domingo-Ferrer, Multi-Application Smart Cards and Encrypted Data Processing, Future Generation Computer Systems 13 (1997) 65-74.*
International Preliminary Report on Patentability issued on Oct. 8, 2008 in PCT Application No. PCT/CN2007/000286.
International Search Report issued on May 17, 2007 in PCT Application No. PCT/CN2007/000286.
Deville, et al. Smart Card Operating Systems: Past, Present and Future. Internet Citation, Feb. 14, 2003, XP-002439408. Retrieved from the Internet: URL:http://www-sor.inria.fr/galland/papers/DGGJ03nordu.pdf [retrieved on Jun. 27, 2007].
Deville, et al. Trusted Collaborative Real Time Scheduling in a Smart Card Exokernel, Apr. 1, 2004, pp. 1-15, XP-002657474. Retrieved from the Internet: URL:http://citeseerx.ist.psu.edu/viewdoc/summary?doi=10.1.1.10.8237 [retrieved on Aug. 17, 2011].
Examination Report dated Aug. 28, 2009 for Singapore Patent Application No. 200808093-9.
Extended European Search Report dated Sep. 6, 2011 for European Application No. EP 07 70 2204.
International Search Report for PCT Application No. CN2006/001919, dated Nov. 30, 2006.
International Preliminary Report on Patentability issued on Sep. 23, 2008 in PCT/CN2007/000427, filed Feb. 7, 2007.
International Search Report dated May 31, 2007 in PCT/CN2007/000427, filed Feb. 7, 2007.
Microsoft, "Microsoft Extensible Firmware Initiative FAT32 File System Specification", FAT: General Overview of On-Disk Format, Microsoft Hardware White Paper, pp. 1-34, dated Dec. 6, 2000. Cited in International Search Report PCT/CN2007/000427 mailed May 31, 2007, as "Microsoft Extensible Firmware Initiative FAT32 File System Specification, FAT: General Overview of On-Disk Format, Version 1.03, microsoft.com/whdc/system/platform/firmware/fatgen.mspx> (Microsoft Corporation), Dec. 6, 2000 see the whole document."
International Search Report dated Mar. 20, 2008 in International Application No. PCT/CN2007/003490.
Office Action dated Jan. 21, 2009 for Chinese Patent Application No. 2006101696379.
Office Action dated Nov. 7, 2011 for Japanese Patent Application No. 2009-543327.
Written Opinion mailed May 13, 2010 for Singapore Patent Application No. 200904128-6.
Invitation to Respond to Written Opinion dated Aug. 3, 2010 for Singapore Patent Application No. 200904128-6.
Written Opinion mailed Apr. 6, 2011 for Singapore Patent Application No. 200904128-6.
Invitation to Respond to Written Opinion dated May 3, 2011 for Singapore Patent Application No. 200904128-6.
Examination Report dated Dec. 22, 2011 for Singapore Patent Application No. 200904128-6.

* cited by examiner

EMBEDDED OPERATING SYSTEM ARCHITECTURE FOR SMART CARD

TECHNICAL FIELD

The present invention relates to the embedment technology, and more specifically, to embedded operating system of smart card and the method for processing the task.

BACKGROUND

Along with the constant progress of Science and Technology, the applications of smart card already became an essential part in people's life. Many applications, from the building entrance guard to the mobile telephone, from the public traffic card to the campus card, from the EMV bank card to the electronical identification, are closely linked to the smart card. With the popularity of the applications of the smart card, the functions of the smart card are required to be more and more diverse, which means the hardware technique should be improved continually and quickly. For example, the number of bits of the CPU is changed from the initial 8 to the widely used 16, and gradually being changed to 32; for the storage capacity, from the initial tens of bytes, to the tens of thousand, hundreds of thousand, and even to Million; for the type of memories, from the initial ROM, RAM and EEPROM to the current NOR FLASH, and then to the new generation of technique combining NOR FLASH and NAND FLASH; for the transmission interface, from the single interface ISO7816 to the high speed interface combining MMC or USB for several channels.

Although the hardware process has been improved quickly, the structure of the chip operating system of the smart card has no bigger change. FIG. 1 shows the framework of the software and hardware of the present smart card, from which we can see that the framework of the software and hardware of the present smart card consists of the hardware platform, the self-defined Card Operating System (COS) and the application of the smart card, wherein, the COS and the application work as one body in most conditions with no evident bound between them. In this structure, since the COS is developed for a special hardware platform, it should be correspondingly modified when the hardware platform changes. FIG. 2 is the schematic diagram of the operating system of the present smart card, from which we can see that the operating system is generally a relatively simple foreground/background system or super-loop system which is an infinite loop, and in the loop, corresponding functions are called to perform the corresponding operations, for example, the interrupt service routine for asynchronous event, and the critical operation with strong time relativity is guaranteed by the interrupt service. Since the information offered by the interrupt service can only be processed until the background routine reaches this information. This system is poorer than it practically is on terms of the betimes of the system processing the information. The response time in the worst case depends on the processing time of the whole loop. Since the time is not constant, the precise time that the routine passes a special part can not be decided. Moreover, if the routine is modified, the time sequence of the loop can be affected.

In addition, because of the super-loop structure of the conventional COS, it is complicated for the system to manage several different applications at the same time, thus one card with the conventional structure is only for one application, which means the COS is generally responsible for one application. Therefore the application and the COS are developed together at most cases and there is no evident bound between them.

With a diversity of hardware platforms at the bottom layer of the smart card, the framework of the software and hardware of the traditional smart card can not meet the needs, and a new COS capable of processing large capacity, several channels and several applications with harder real-time is desired.

CONTENT OF THE INVENTION

The present invention resolves the technical problem that one smart card corresponds to only one application and one hardware platform in the prior art by offering a Chip Operating System (COS) of the smart card and the method thereof for processing the tasks.

In order to achieve this object:

The present invention offers an embedded operating system of smart card to manage and control creating tasks on the hardware platform which exchange information with outside, the system includes the initialization unit, the real-time kernel unit and the task unit, the hardware platform is connected with the initialization unit, the real-time kernel unit and the task unit, and the real-time kernel unit includes the task initialization unit, task control unit and the task scheduling unit; wherein The initialization unit is used to initialize the hardware platform and the real-time kernel unit;

The task initialization unit is used to create and initialize the tasks in the task unit;

The task control unit is used to check the tasks in the task unit and start up the task scheduling unit according to the rules set by the system;

The task scheduling unit is used to schedule the tasks in the task unit to be executed under the control of the task control unit;

The task unit includes at least one task created by the task initialization unit.

The real-time kernel unit also includes:

The task control unit, used to control the synchronization and communication between the tasks in the task unit according to the condition of the task execution, create the synchronization or mutual exclusion mechanism, and also start up the operation of the task scheduling unit.

The real-time kernel unit also includes:

The task re-scheduling and switching unit, used to re-schedule and switch the tasks according to the signal starting in the task control unit.

The hardware platform has at least one first data transmission channel.

The hardware platform also includes one or more second data transmission channels.

The first data transmission channels are ISO7816; the second channels are MMC or USB data transmission channels.

A method for processing the tasks in the embedded operating system of the smart card includes the following steps:

A. initializing the system;

B. creating at least one task according to the function set by the system;

C. scheduling the pre-execution task according to the priority of the system;

D: executing the task and returning the executing result through a data transmission channel.

Between step B and step C, there is:

B1: creating the synchronization or mutual exclusion mechanism.

The synchronization or mutual exclusion mechanism is semaphore, event flag, message mailbox, or/and the message queue.

In step B, the tasks are created by applying API (Application Programming Interface) function.

The way of scheduling the tasks in step C is:

The one with the highest priority in several tasks starts up to be executed;

The tasks with the same priority are successively executed according to the time flake cycle scheduling.

Between step C and step D, there is:

C1, the task re-scheduling and switching step, is started up in any one of the following cases:

a. when a new reached external event exits from the interrupt service routine;

b. when a task scheduling delay routine is hanged up by itself;

c. when a task is waiting for a special semaphore to be released;

d. when a task releases a special semaphore;

e. when a new task is created during executing the task.

The advantages of the present invention are:

The embedded operating system of smart card of the present invention strengthens the support for the data channels of the hardware platform, supporting not only the single data channel-ISO7816 of the conventional smart card, but also the coexisting two or more data channels, thus the smart card could exchange information with the device terminal in a more flexible way with a higher speed; The chip operating system of the smart card of the present invention strengthens the support for the applications of the smart card, supporting not only the single application of the conventional smart card, but also several applications running on one card at the same time, thus the smart cards can be used more effectively.

In addition, the operating system is transportable, solidifiable, easy to be improved, deprivable, has several tasks and a variety of system services.

In sum, the system and the method of the present invention resolves the technical problem that one smart card corresponds to only one application and one hardware transmission channel in the prior art and the smart card has poor real time property.

THE SPECIFIC EMBODIMENTS OF THE PRESENT INVENTION

Figure 1:
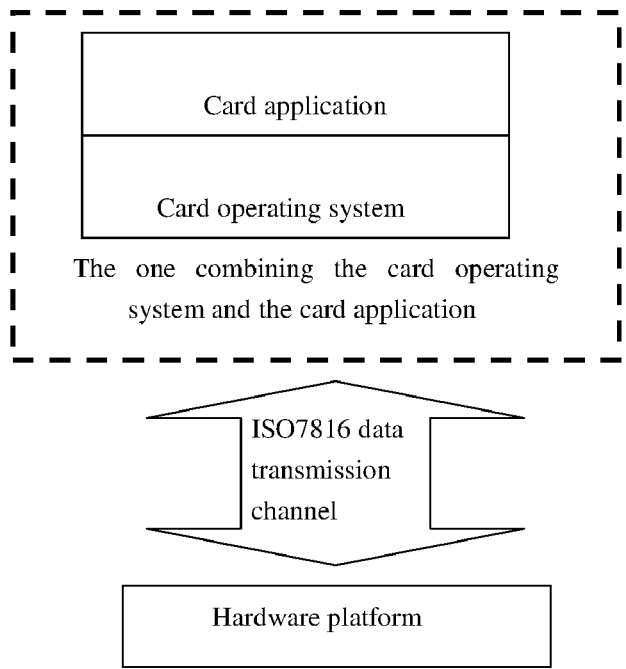
FIG. 1 is a structural diagram of the system (the framework the of the software and hardware) of the conventional smart card.
Figure 2:
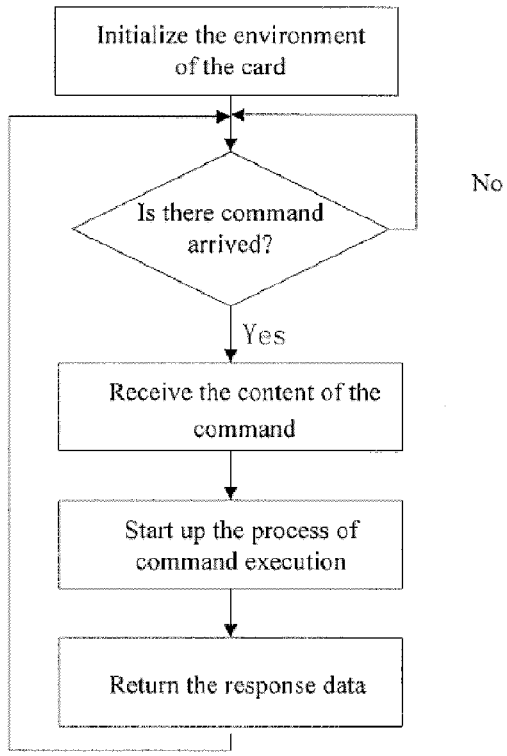
FIG. 2 is a work flow chart of the operating system of the conventional smart card.
Figure 3:
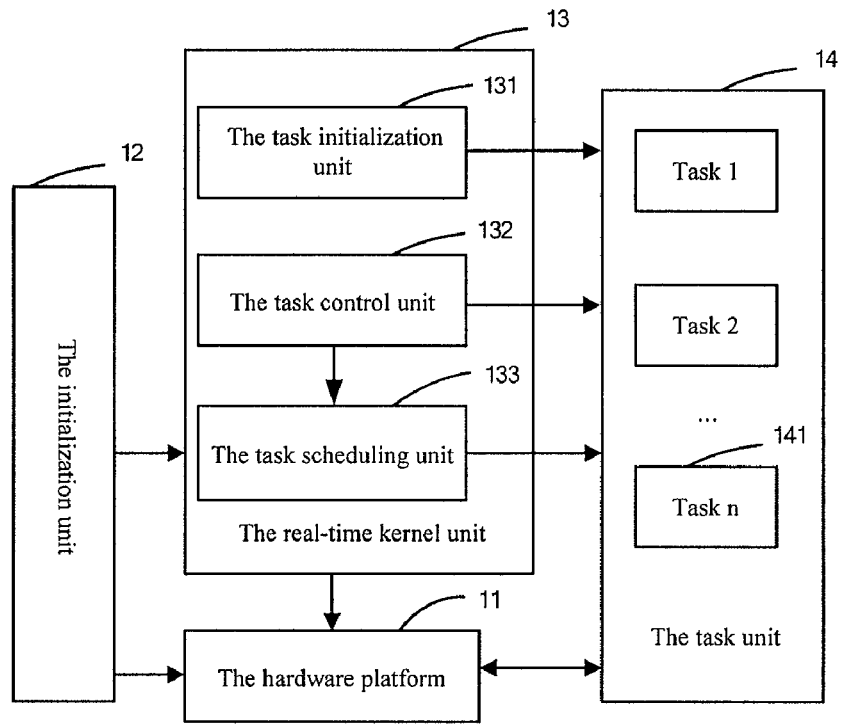
FIG. 3 is a structural diagram of the operating system of the smart card in accordance with the present invention.

FIG. 3 is a structural diagram of the operating system of the smart card in accordance with the present invention. The system of the present invention is used to manage and control the hardware platform 11 which exchanges information with outside, and the hardware platform 11 is connected with the initialization unit 12, the real-time kernel unit 13 and the task unit 14, and the real-time kernel unit 13 includes the task initialization unit 131, the task control unit 132 and the task scheduling unit 133; where the initialization unit 12 is used to initialize the hardware platform 11 and the real-time kernel unit 13; the task initialization unit 131 is used to create tasks in the task unit and initialize the tasks in the task unit if necessary, and also to delete the special unnecessary tasks; the task control unit 132 is used to control the synchronization and communication between the tasks in the task unit 14, which means applying special mechanism to realize the synchronization or mutual exclusion operation between the tasks or between the interrupt service routine and the tasks; the task scheduling unit 133 is used to schedule the tasks in the task unit according to the control instruction of the task control unit 132, and the way of scheduling is to hang up the tasks, make the tasks ready or schedule the tasks to be executed according to the rules set by the system, and the rules can be set through the prior art.

In the system of the present invention, since the task control unit 132 and the task scheduling unit 133 in the real-time kernel unit 13 could make the system schedule several tasks, the hardware platform could support more data transmission channels at the same time besides of the traditional ISO7816 data transmission channel to support several applications with different functions. The execution for each channel and application is in real time, thus solve the technical problem that one card corresponds to only one application and a hardware transmission channel in the prior art and the card is not real-time. In this technical field, the task can also be called as thread, process, and so on, while "task" is used to stand for all of them in the present invention. The tasks in the task unit 14 are divided according to different functions of the platform, for example, different applications supported by the platform are edited to be different tasks; when the platform has several data channels, different executions for different data channels can be edited as different tasks.

In the system of the present invention, after the hardware platform 11 is powered on, the initialization unit 12 initializes the hardware platform 11 to make all parts of the hardware platform 11 work properly; then initialize the real-time kernel unit 13, that is, initialize the necessary variables and data structure included in the real-time kernel unit 13; after the initialization unit 12 completes its work, it hands the CPU control right in to the real-time kernel unit 13; the task initialization unit 131 in the real-time kernel unit 13 firstly creates several tasks and initialize them if necessary, thus relate the tasks in the task unit 14 with the real-time kernel unit 13 to make the task scheduling unit 133 in the real-time kernel unit 13 schedule the tasks in real time. The tasks in the task unit 14 can be divided according to different data transmission channels of the platform or different applications, in the embodiment of the present invention, since the hardware platform has the first data transmission channel ISO7816 and the second data transmission channel MMC (or USB), the tasks can be divided into the first task and the second task, where the first task executes the data transmission channel ISO7816, the second task executes MMC. In the practical applications, after the task initialization unit 131 creates the tasks, the task control unit 132 could create the synchronization and communication mechanism, such as semaphore, event flag, message mailbox, message queue, between the tasks or between the tasks and the interrupt service routine if desired. When the semaphore or the message waited by a task has not been arrived yet, the task control unit 132 will notify the task scheduling unit 133 to hang up the task; otherwise, the task control unit 132 will notify the task scheduling unit 133 which will transfer the state of the task from be hanged up to be ready.

Figure 4:
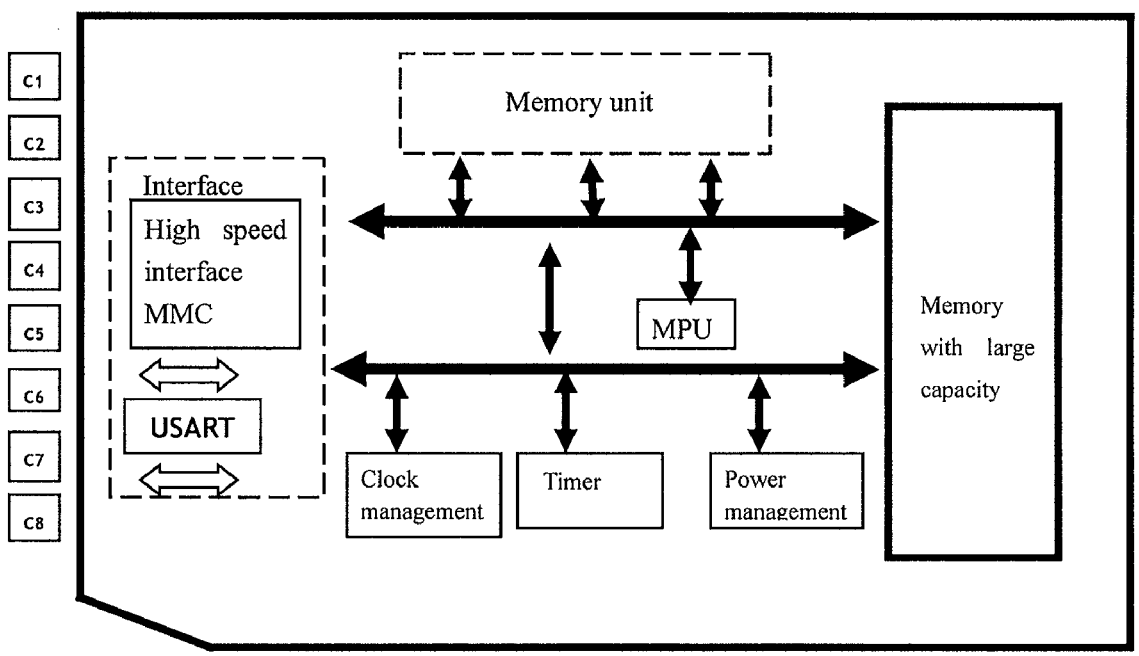
FIG. 4 is a structural diagram of the typical hardware platform in accordance with the present invention.

In the embodiment of the present invention, as shown in FIG. 4, the structure of the hardware platform 11 of the present system is similar to that of the present hardware platform, it totally supports ISO7816 communication protocol, and the structure could be defined by referring to the hardware's structure and size of the ISO7816, while only extend two pins C4 and C8 and apply the MMC high speed data transmission interface, that is, the first data transmission channel of the hardware platform 11 of the present embodiment is the conventional ISO7816 data transmission channel, while the second is the MMC data transmission channel. The visit for the storage area of the hardware platform can be implemented through ISO7816 channel or the high speed data transmission channel by applying the present system, while ensure the high speed transmission of the tasks between the smart card and the device terminal; In addition, the storage device for storing the user data information on the hardware platform corresponding to the present system can have several types, for example, NAND Flash can be applied to make the user has more storage space (16M~1G or more) and adapt to different storage ways in different conditions.

In the present invention, it should be noted that, since the hardware platform 11 in accordance with the embodiment of the present invention has both the conventional ISO7816 data channel and one or several high speed data transmission channels, it is possible that the external events of several channels can be reached at the same time point, or the external events of the other channels reach when the external event of one channel is being responded. Therefore, the real-time kernel unit 13 running on the hardware platform 11 can respond several external events at the same time according to the above process.

Since the hardware platform of the operating system of the present invention may have several external events from different hardware interfaces, in order to make the system respond the external events from several hardware interfaces in time, ensure the real-time, and avoid the external events to be discarded because it can not be handled in time, the real-time kernel unit 13 applied by the present invention is a real-time operating system (RTOS), through which several external events are managed in real time to overcome the technical problem that the operating system of the smart card having the conventional single task super-loop structure can only execute the events according to the proper routine sequence.

In the embodiment of the present invention, the applied RTOS is offered to the developers in the form of API functions which are used to implement the functions such as task initialization, task control (control the communication and the synchronization between the tasks), task scheduling, time management; a task can also be called as a thread, which is a simple program, and the program thinks that it owns the whole CPU. Each task is a part of the whole application and is offered with a certain priority, and has its own CPU register and stack space.

The task control unit 132 of the real-time kernel unit 13 of the present invention offers a special mechanism to implement the synchronization and communication between the tasks or between the tasks and the interrupt service routine, and the special mechanisms can be: semaphore, event flag, message mailbox, message queue, and so on. When the semaphore or the message waited by a task has not been arrived yet, the task control unit 132 will notify the task scheduling unit 133 to hang up the task; otherwise, the task control unit 132 will notify the task scheduling unit 133 to transfer the state of the task from be hanged up to be ready.

The task scheduling unit 133 of the real-time kernel unit 13 of the present invention is responsible for scheduling each task, that is, assign CPU time for each task. The real-time operating system applied by the present invention does not support the tasks with the same priority, thus the task scheduling unit 133 always schedule the be-ready task with the highest priority to be executed; There are several timings for scheduling the tasks, such as, there is a new task to be created, a task calls the delay function to delay it for a while, the task waits for semaphore, the semaphore is released, and so on, in all these cases, the real-time kernel unit 13 starts up the task scheduling unit 133 to check if the priority of the be-ready task with the highest priority has been changed or not, if yes, the task scheduling unit 133 saves the running environment of the being processed task to a special area of the memory, and transfer its running state from be being processed to be ready, meanwhile, the operating environment of the be-ready task with the highest priority is scheduled to CPU from the special area of the memory of the hardware platform, therefore the state of the task is changed from be-ready to be-processed.

In the system of the present invention, the tasks or the threads in the task unit 14 can be divided into several ones to be processed according to the characteristic of the hardware of the hardware platform and different applications, and the real-time kernel unit 13 can manage and schedule several tasks, thus the design of the application programs is largely simplified.

In the preferred embodiment of the present invention, the tasks in the task unit 14 are divided into different ones according to different interfaces of the hardware platform 11, and they are respectively ISO7816 tasks and MMC tasks (or USB tasks), where the ISO7816 receives the commands from the ISO7816 channel according to the ISO7816 communication protocol, analyze and perform the command, and return the result through the ISO7816 channel; while the MMC task receives, responds and performs all requests from the MMC channel according to the MMC communication protocol. The events processed by the MMC/USB task are generally read and write operation for the memory with large capacity. The task scheduling unit 133 schedules the be-ready task with the higher priority in these two tasks to be processed, for example, according to the application requirement, the ISO7816 task is defined to have a higher priority than MMC task has; Therefore, after the real-time kernel unit 13 is started up, the ISO7816 task with the higher priority is scheduled to be processed at first.

In the embodiment of the present invention, the task control unit 132 defines two synchronized semaphores, respectively ISO semaphore and MMC semaphore. The ISO semaphore is used for the synchronization between the interrupt service routine and the ISO7816 tasks to ensure the ISO7816 be hanged up when there is no ISO7816 event reach; otherwise, the ISO7816 task is changed from be hanged up to be-ready and notify the task scheduling unit 133 to re-schedule the tasks; The MMC semaphore is used for the synchronization between the interrupt service routine and the MMC tasks to ensure the MMC be hanged up when there is no MMC event reach; otherwise the MMC task is changed from be hanged up to be-ready and notify the task scheduling unit 133 to re-schedule the tasks.

In the system of the present invention, it is very easy to add a new task or delete a task, thus it is also very easy to correspondingly add a new application or delete an existing application, which largely increases the flexibility. For the system of the present invention, different tasks only have the difference about their priority or task numberings, each task could define different priority strategy as desired and different synchronization and mutual exclusion strategies can be defined between tasks or between the task and the interrupt service routine.

Figure 5:
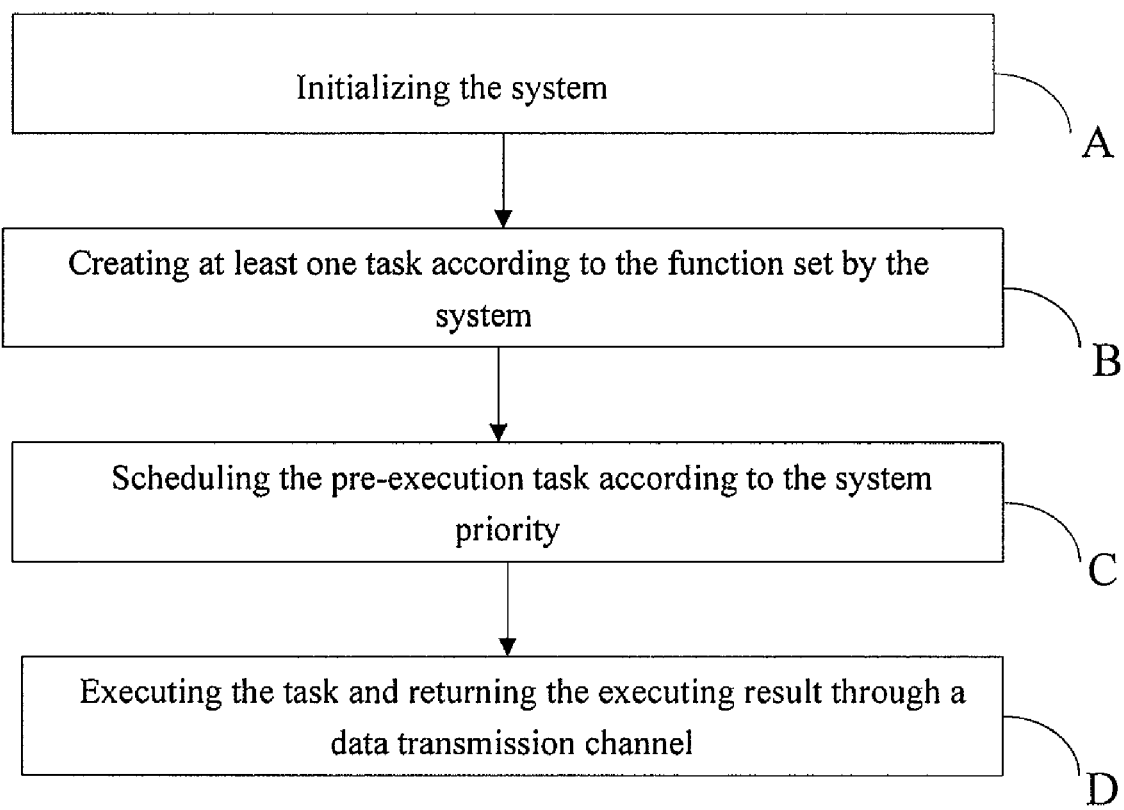
FIG. 5 is a flow chart of the method for processing tasks in the embedded operating system of smart card in accordance with the present invention.

FIG. 5 is the flow chart of the method for processing the tasks in the embedded operating system of smart cards in the present invention, and the method includes the following steps:

A: initializing the system;

B: creating at least one task according to the function set by the system;

C: scheduling the pre-execution task according to the priority of the system;

D: executing the task and returning the executing result through a data transmission channel.

In the present invention, since there may have synchronization or mutual exclusion operation between several tasks or between the task and the interrupt service routine, thus between step B and step C, there is step B1 which creates the synchronization or mutual exclusion semaphore by applying the API functions.

The method of the present invention will be described in further detail by referring to the above system:

1. Firstly, the initialization unit 12 in the system of the present invention initializes the hardware platform 11; for example, the initialization unit 12 initializes the hardware units, such as clock, memory, in the hardware platform 11;

2. Before the system properly works, the initialization unit 12 initializes the real-time kernel unit 13, in this process, some system variables and the data structure are initialized as desired; The initialization of the real-time kernel unit 13 can be implemented by calling the API function offered in the real-time kernel unit by combining of the system embodiment of the present invention;

3. The task initialization unit 131 creates several tasks as desired; refer to the above system of the present embodiment, when creating the tasks, according to different data transmission channels on the hardware platform, the task initialization unit 131 creates two tasks: ISO7816 task and the MMC task;

4. In the method of the present invention, synchronization or mutual exclusion is needed between several tasks in the task unit or between the task and the interrupt service routine, thus the task control unit 132 should create the necessary semaphore, message mailbox, message queue, and so on for the synchronization or mutual exclusion, and further for the synchronization, mutual exclusion or the communication between the tasks in the task unit; the task control unit 132 of the present invention also offers several synchronization or mutual exclusion mechanisms, such as semaphore, event flag, message mailbox, message queue, and so on, which can be selected according to different applications;

5. after the tasks and semaphores (if necessary) are created, the task scheduling unit 133 will search for and schedule the be-ready task with the highest priority to be processed;

In the system, there always has task to be hanged up because of delay or waiting for a special event, otherwise, all tasks with lower priority can not be processed; When a task is hanged up, the task scheduling unit 133 saves the operating environment of the task to a special area of the memory of the hardware platform, meanwhile, re-searches the be-ready task with the highest priority whose operating environment is put to the CPU from the special area of the memory to make the state of task transfer from be-ready to be processed. The task scheduling unit 133 switches and re-schedules the tasks in any one of the following cases:

a. When a new reached external event exits from the interrupt service routine;

b. When a task scheduling delay routine is hanged up by itself;

c. When a task is waiting for a special semaphore to be released;

d. When a task releases a special semaphore;

e. When a new task is created during the task processing.

6. The task is completed, and the result is returned through the data transmission channel.

Since the present system has many mechanisms for task re-scheduling and switching, the method of the present invention can be used to avoid the problem that one task occupies the processor so long that other events can not be processed for a long time.

In the following, the task scheduling and communication of the present invention will be described in further detail: the synchronized semaphore in the embodiment is used to implement the synchronization between the tasks and the events to make the task with higher priority gives up the CPU source for the task with lower priority when there is no event reaching to the task with the higher priority. In the embodiment of the present invention, the ISO7816 is defined as the synchronized semaphore, by which the ISO7816 task and the interrupt service routine communicate with each other, while it is waiting for events to be happened in the task unit, and the interrupt service routine sends semaphore to notify the happening of the event to the task control unit; In the ISO7816 task, it is determined if there is ISO7816 event reach or not according to the ISO7816 synchronized semaphore, if no, the task is hanged up; meanwhile, if there is MMC event have been reached, the MMC task is the be-ready task with the higher priority in the system, and the real-time kernel will schedule the task to be processed; Once an external ISO7816 event reaches, the ISO7816 synchronized semaphore is released in the interrupt service routine of the ISO7816, at the same time, the ISO7816 task is changed from be hanged up to be ready and become the be-ready task with the highest priority again and is scheduled to be processed by the task scheduling unit.

In sum, the system and the method of the present invention strengthens the support for the data channels of the hardware platform, supporting not only the single data channel-ISO7816 of the conventional smart card, but also the coexisting two or more data channels, thus the smart card could exchange information with the device terminal in a more flexible way with a higher speed;

Meanwhile, the chip operating system of the smart card of the present invention strengthens the applications of the smart card, supporting not only the single application of the conventional smart card, but also several applications running on one card at the same time, thus the smart card can be used more effectively.

In addition, since the real-time operating system is used, the chip operating system of the smart card of the present invention can process the tasks in a more flexible way with higher speed, therefore it has hard real-time and high effectiveness.

Of course, the present invention may have many other embodiments. Therefore, without departing from the spirit and scope of the present invention, those skilled in the field can make all kinds of modification or variations which should belong to the scope of the claims of the present invention and its equivalent.

The invention claimed is:

1. An embedded operating system of a smart card to manage and control tasks and exchange information with applications outside the smart card, the system comprising:
   an initialization unit,
   a real-time kernel unit, which comprises of a task initialization unit,
   a task control unit and a task scheduling unit,
   a task unit, and
   a hardware platform on which the initialization unit, the real-time kernel unit and the task unit executes; wherein
   the initialization unit is configured to initialize the hardware platform and the real-time kernel unit;
   the task initialization unit is configured to create and initialize a plurality of tasks, wherein the plurality of tasks is stored in the task unit;
   the task control unit is configured to:
   1) start up the operation of the task scheduling unit,
   2) control the synchronization and communications between the plurality of tasks by implementing synchronization or mutual exclusion mechanisms between the plurality of tasks or between the interrupt service routine and the plurality of tasks, and
   3) execute the plurality of tasks; and
   the task scheduling unit is configured to schedule each of the plurality of tasks to be executed under the control of the task control unit by:
   1) hanging up the task or setting the task to ready, and
   2) scheduling the ready task with the highest priority for execution.

2. The system of claim 1, wherein the real-time kernel unit further comprises of a task re-scheduling and switching unit, configured to re-schedule and switch the plurality of tasks to be executed under the control task control unit.

3. The system of claim 1, wherein the hardware platform contains at least one first data transmission channel.

4. The system of claim 3, wherein the hardware platform also contains one or more second data transmission channels.

5. The system of claim 4, wherein the first data transmission channel is an ISO7816 data transmission channel and the second channel is either a MMC or USB data transmission channel.

6. The system of claim 1, wherein the synchronization or mutual exclusion mechanisms comprises at least one of: a semaphore, an event flag, a message mailbox, and a message queue.

7. The system of claim 1, wherein the plurality of tasks are created by calling an Application Programming Interface (API) function.

8. The system of claim 1, wherein the task scheduling unit schedules ready tasks with the same priority using a round robin scheduling method.

* * * * *